Figure 1:
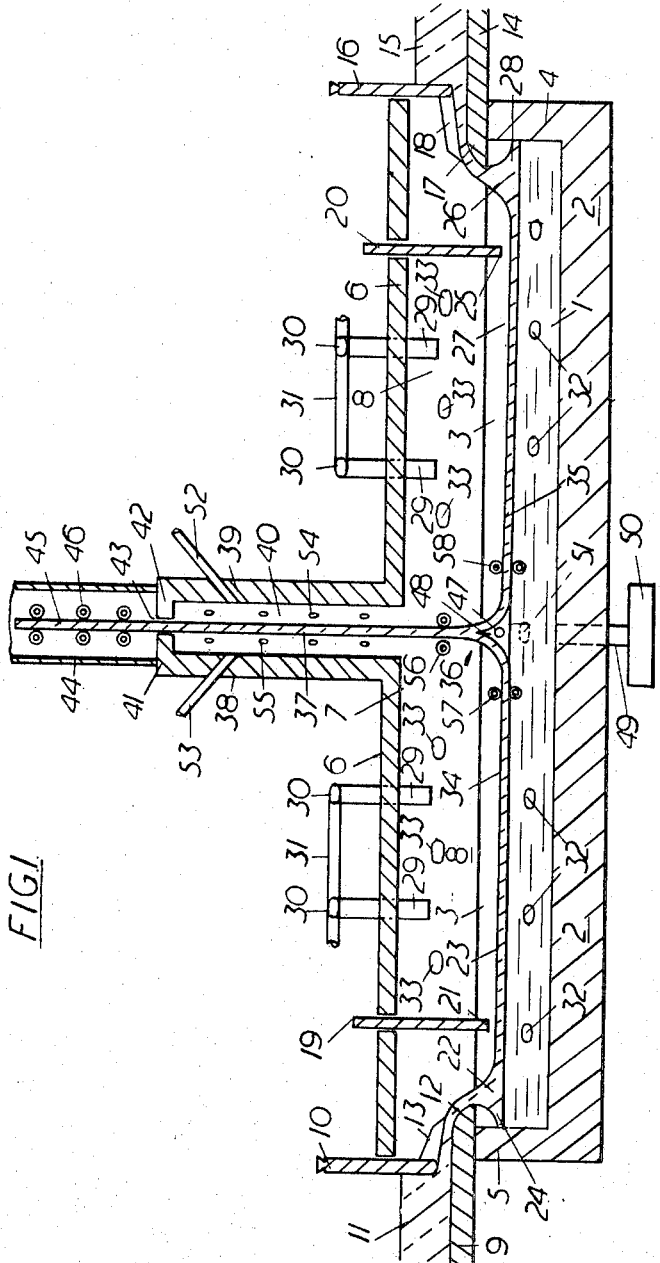

Nov. 7, 1967   D. F. PILKINGTON ET AL   3,351,446
METHOD AND APPARATUS FOR VERTICALLY DRAWING
GLASS FROM A MOLTEN METAL BATH
Filed Nov. 19, 1963   2 Sheets-Sheet 2
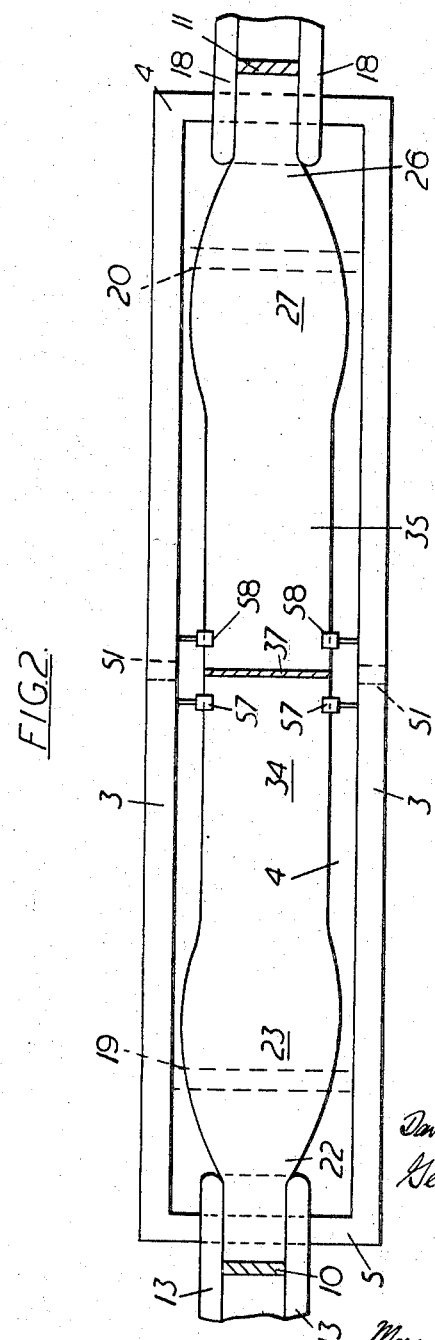
Inventors
David Frost Pilkington
George Alfred Dickinson
By Morrison, Kennedy & Campbell
Attorneys United States Patent Office 3,351,446
Patented Nov. 7, 1967

3,351,446
METHOD AND APPARATUS FOR VERTICALLY DRAWING GLASS FROM A MOLTEN METAL BATH
David Frost Pilkington, Aughton, near Ormskirk, and George Alfred Dickinson, St. Helens, England, assignors to Pilkington Brothers Limited, Liverpool, England, a corporation of Great Britain
Filed Nov. 19, 1963, Ser. No. 324,677
Claims priority, application Great Britain, Nov. 20, 1962, 43,926/62
10 Claims. (Cl. 65—65)

This invention relates to the manufacture of flat glass and in particular to a method of and apparatus for manufacturing flat glass in which glass is advanced in ribbon form along a bath of molten metal.

It is a main object of the present invention to provide an improved method of manufacturing flat glass from glass which has been advanced in ribbon form along a bath of molten metal thereby acquiring a fire finish lustre and being free from distortions.

A further object of the invention is to provide a method of manufacturing flat glass in ribbon form of various commercial thicknesses.

According to the invention from its broadest aspect there is provided a method of manufacturing flat glass in ribbon form comprising advancing two layers of glass in ribbon form towards each other along the surface of molten metal, bringing said layers in ribbon form together at a confluence where the ribbons coalesce, and drawing a ribbon of glass upwardly from said confluence.

Preferably in a method of manufacturing flat glass in ribbon form according to the invention the glass from which the ultimate ribbon is formed is advanced along a bath of molten metal without lateral constraint, and from this aspect a method according to the invention comprises the steps of individually feeding glass at a controlled rate to opposite ends of a bath of molten metal, advancing the glass along the bath from either end under thermal conditions which ensure unhindered lateral flow of the advancing glass to form two oppositely moving buoyant layers of molten glass advancing towards each other in ribbon form, cooling said layers of glass while they are advancing along the bath, bringing the cooled layers in ribbon form together at a confluence where the layers coalesce, and drawing a ribbon of glass upwardly from said confluence.

The two buoyant layers of molten glass in ribbon form which are advanced towards each other in ribbon form may be of such viscosity that the ribbons meet and coalesce while they are both in contact with the bath surface. Alternatively the buoyant layers in ribbon form may be cooled until they are sufficiently viscous to be bent away from the bath to a confluence which is above the bath surface.

Accordingly the invention also comprehends a method of manufacturing flat glass in ribbon form, comprising the steps of individually feeding molten glass at a controlled rate to opposite ends of an elongated bath of molten metal, advancing the glass along the bath from either end under thermal conditions which ensure unhindered lateral flow of the advancing glass to form two oppositely moving buoyant layers of molten glass advancing towards each other in ribbon form, cooling the buoyant layers of molten glass until they are sufficiently viscous to be raised from the bath, bending the cooled ribbons away from the bath to a confluence above the bath surface, at which confluence the ribbons coalesce, and drawing a ribbon of glass upwardly from said confluence.

Further according to the invention a protective atmosphere is maintained over the bath of molten metal to prevent the formation in the bath of contaminants for the glass, and a purge of protecting atmosphere is directed across the bath surface under the two ribbons as they are bent away from the bath surface to said confluence. Thus protection of the bath surface underneath the confluence of the two ribbons is assured. To give additional protection against contamination of the under surfaces of the ribbons as they are drawn together at the confluence the invention also comprehends causing circulation of the molten metal in the bath in the region underneath said confluence, whereby the surface of the molten metal bath is continuously renewed in that region.

The ribbon of glass which is drawn upwardly from the confluence of the two ribbons formed on the bath of molten metal is drawn upwardly by tractive effort applied to the ribbon from above, for example by drawing rolls which grip the stiffened ribbon in an annealing tower into which the ribbon is drawn. The tractive effort may be regulated, while controlling the viscosity of the glass as the ribbon is raised through the drawing chamber whereby the ribbon is attenuated to a desired thickness and is sufficiently stiffened to arrest further dimensional change when that thickness is achieved.

The invention also comprehends apparatus for manufacturing flat glass in ribbon form comprising a tank structure containing molten metal, and having inlets at opposite ends of the tank structure, means for delivering glass through said inlets and for advancing the glass along the molten metal as two oppositely moving layers of glass in ribbon form, to a confluence where the layers coalesce, and means for drawing a ribbon of glass upwardly from said confluence.

The tank structure may contain two aligned baths of molten metal along each of which one of said oppositely moving layers of glass in ribbon form is advanced. In a preferred embodiment of the invention the two layers are advanced towards each other along the same bath, and from this aspect the invention comprehends apparatus for manufacturing flat glass in ribbon form comprising an elongated tank structure holding a bath of molten metal and having inlets to the bath at opposite ends of the bath, a roof bridging the tank structure, a drawing chamber extending upwardly from said roof in a central region thereof, means for delivering molten glass at a controlled rate through the inlets to the bath and advancing the glass along the bath, temperature regulators maintaining thermal conditions along the bath to ensure that the glass is advanced along the bath as two oppositely moving buoyant layers of molten glass in ribbon form, the configuration of the tank structure being such that at the bath surface the width of the tank is greater than the width of the layers of molten glass so as to permit unhindered lateral flow of the molten glass in said layers, temperature regulators associated with the bath for cooling said buoyant layers in ribbon form as they are advanced until they are sufficiently viscous to be bent away from the bath to a confluence in the central region of the bath, at which confluence the cooled bodies in ribbon form coalesce, and means associated with the drawing chamber for drawing a ribbon of glass upwardly from said confluence through the drawing chamber.

In a preferred embodiment of the invention an annealing tower is mounted above the drawing chamber, the drawing chamber has a slot-shaped outlet at its upper end through which the ribbon of glass is drawn into the annealing tower by drawing rolls engaging the ribbon of glass in the annealing tower, the drawing rolls are driven by controllable driving means operable to regulate the tractive effort applied to the ribbon by said drawing rolls.

Further according to the invention means are provided for supplying protective atmosphere to the headspace over the tank structure, and means are provided in the tank structure for directing a stream of protective atmosphere across the surface of the molten metal bath in the region where the two ribbons of glass are bent away from the bath surface.

Edge rolls may be provided in the tank structure to engage the edges of the two layers in ribbon form before they are bent away from the bath surface.

The invention also comprehends flat glass produced by a method as set out above, and sheets of glass cut therefrom.

In order that the invention may be more clearly understood a preferred embodiment thereof will now be described, by way of example, with reference to the diagrammatic accompanying drawings, in which:

FIGURE 1 is a sectional elevation of apparatus for manufacturing flat glass in ribbon form according to the invention, the apparatus including an elongated tank structure holding a bath of molten metal and means for delivering glass at a controlled rate to each end of the bath and for drawing a ribbon of glass upwardly from the glass advancing along the bath, and FIGURE 2 is a plan view of the tank structure holding the bath of molten metal of FIGURE 1.

In the drawings like reference numerals designate the same parts.

Referring to the apparatus shown in FIGURES 1 and 2, a tank structure holding a bath of molten metal 1 comprises a floor 2, side walls 3 and end walls 4 and 5 at the opposite ends of the elongated tank structure. Preferably the bath 1 of molten metal is so constituted as to have the characteristics of the molten metal bath described in U.S. Patent No. 2,911,759. The bath is preferably a bath of molten tin or an alloy of tin in which tin predominates.

The tank structure is bridged by a roof structure comprising a roof 6 and side walls 7, one of which is shown in FIGURE 1. The roof structure defines a headspace 8 over the bath 1 of molten metal and provides a tunnel over the bath. At each end of the bath there is an inlet for molten glass to the bath. At the left-hand end of the tank structure as illustrated in FIGURES 1 and 2, there is shown a forehearth 9 of a continuous glass melting furnace and a regulating tweel 10. Molten glass 11 flows from the melting furnace over the forehearth 1 to a spout which comprises a lip 12, and side jambs 13. The lip 12 and side jambs 13 form a spout of generally rectangular cross-section and the spout lip overlaps the end wall 5 of the tank structure.

Similarly at the right-hand end of the tank structure as shown in FIGURE 1, there is a forehearth 14 along which flows molten glass 15 from the same glass melting furnace as the glass 11. Alternatively glass of the same composition and refinement may be fed to the two forehearths 9 and 14 from two glass melting furnaces, or the molten glass 15 may be glass of a different composition from the molten glass 11. The flow of molten glass 15 along the forehearth 14 is regulated by a regulating tweel 16 and the molten glass flows under the tweel 16 to a spout which comprises a lip 17 and side jambs 18. The lip 17 and side jambs 18 together form a spout of generally rectangular cross-section, and the spout lip 17 overlaps the end wall 4 of the tank structure.

The level of the surface of the bath of molten metal is indicated at 18 and the configuration of the tank structure as illustrated in FIGURE 2 is such that the distance between the side walls 3, 3 of the tank structure is wider than the width of the glass on the bath.

The roof structure includes vertically adjustable end walls 19 and 20 at either end of the bath. The adjustable end of wall 19 at the left-hand end of the bath is set to define a shallow inlet 21 for molten glass 22 flowing from the spout lip 12 on to the bath to establish a layer 23 of molten glass at one end of the bath.

The vertical spacing of the lip 12 of the spout from the surface 18 of the bath is of the order of a few inches and is such as to ensure that a heel 24 of molten glass is formed behind the glass flowing from the spout to the bath, which heel extends rearwardly under the spout lip 12 to the end wall 5.

Similarly at the right-hand end of the tank structure the adjustable end wall 20 is set to define a shallow inlet 25 for molten glass 26 flowing from the spout lip 17 on to the bath to establish a layer of molten glass 27 at the right-hand end of the bath. The vertical spacing of the lip 17 above the surface 18 is similar to that of the spout lip 12 so that a heel 28 of molten glass extends rearwardly under the spout lip 17 to the end wall 4 of the tank structure.

The roof 6 is at intervals provided with ducting 29 connected by branches 30 to headers 31 through which protecting gas is fed into the headspace 8 over the bath to create a plenum of protecting atmosphere in the substantially closed headspace. The protecting gas is a gas which will not react chemically with the metal of the bath to produce contaminants for the glass, thereby protecting the exposed bath surface and preventing the formation of contaminants for the glass.

The temperature of the bath in the tank structure is regulated by thermal regulators 32 immersed in the bath. The temperature in the headspace 8 over the bath is controlled by thermal regulators 33 mounted in the headspace between the sides 7 of the roof structure.

The two layers 23 and 27 of molten glass are established on the bath by feeding molten glass 22 over the spouts at either end of the bath at a controlled rate and advancing the molten glass along the bath from either end of the bath through the restricted inlets 21 and 25 under thermal conditions which ensure the establishment of the two layers 23 and 27 on the bath. The glass in the layers is maintained in molten condition by the temperature regulation of the glass to permit the glass in each of the layers to flow laterally unhindered, the width of the tank structure at the surface of the bath being greater than the width of the layers. The two buoyant layers are advanced towards each other as two oppositely moving buoyant layers of molten glass in ribbon form, indicated at 34 and 35.

As the buoyant layers of molten glass are advanced in ribbon form towards each other they are cooled until they are sufficiently viscous to be raised from the bath and the cooled layers are bent away from the bath surface 18 to a confluence indicated at 36 where the under faces of the two layers meet and coalesce, the viscosity of the glass being sufficiently low to permit the coalescence of the two cooled layers of glass to form a ribbon 37. This ribbon of glass 37 is drawn upwardly from the confluence 36 into a drawing chamber which extends upwardly from the roof 6 in the central region of the roof.

The drawing chamber is formed by side walls 38 and 39, end walls 40, one of which is shown in FIGURE 1 and top closure elements 41 and 42 which define between them and centrally over the drawing chamber a narrow outlet 43 through the top of the drawing chamber.

An annealing tower 44 extends upwardly from the top of a drawing chamber and the stiffened ribbon 45 of flat glass which emerges through the outlet slot 43 is drawn upwardly through the annealing tower by pairs of drawing rollers 36 which grip the stiffened ribbon 45 and apply tractive effort to the ribbon. This tractive effort is regulated by regulating the speed of the rollers 46 and this regulatable tractive effort bends the two cooled layers of molten glass in ribbon form away from the bath surface to the confluence 36 and raises the ribbon 37 so formed through the drawing chamber.

In order to provide addtional protection for the surface of the molten metal bath underneath the confluence of the two ribbons a duct 47 which is connected to the source of protecting gas directs a purge of protecting atmosphere across the bath surface through the space 48 under the confluence of the two layers in ribbon form as they are bent away from the bath. In addition the surface of the molten metal of the bath may be continuously renewed in the region where the two cooled ribbons are bent away from the bath by causing the molten metal in the bath to circulate across the surface of the bath in the region underneath the confluence. This is effected by ducts 49, one of which is shown, which lead upwardly through the floor 2 of the tank structure and are connected to induction heaters 50 mounted underneath the floor 2. The heaters are connected by further ducts 51 indicated in FIGURE 2 to the sides of the bath of molten metal and a circulation of the molten metal is generated by the heaters to cause continuous renewal of the molten metal surface in the manner described in copending U.S. application No. 298,045.

In addition protective gas is supplied through ducts 52 and 53 which extend through the side walls 38 and 39 of the drawing chamber and a gas seal may be provided in the outlet 43 from the drawing chamber by inducing laminar flow of protecting gas through the outlet in the manner described in copending U.S. application No. 315,616.

If the two layers in ribbon form 34 and 35 are maintained less viscous as they are advanced towards each other, the layers meet and coalesce while in contact with the bath surface, and in this embodiment of the invention the maintenance of identical temperature conditions, or substantially so, in both the ribbons assists in stabilising the position of draw of the ribbon 37 upwardly from the confluence on the bath surface.

The ribbon of glass 37 formed at the confluence 36 has a thickness which is the combined thickness of the two ribbons formed on the bath of molten metal and advanced to the confluence. The thickness of the ribbon 37 can be reduced to provide a stiffened ribbon 45 of desired thickness less than the thickness of the ribbon 37 formed at the confluence by regulating the tractive effort applied to the ribbon 45 by controlling the speed of the rollers 46 while controlling the viscosity of the ribbon of glass 37 as it is raised through the drawing chamber. Heaters 54 and 55 are mounted in the drawing chamber on opposite sides of the path of the ribbon and these heaters control the temperature gradient in the drawing chamber and so the rate of change of viscosity of the glass in the ribbon. Combined control of the speed of the drawing rollers 46 and of the temperature gradient in the drawing chamber enable the ribbon 37 to be attenuated to the desired thickness and to be sufficiently stiffened to arrest further dimensional change when that thickness is achieved. That is, the ribbon 45 drawn into the annealing lehr has a desired thickness and is sufficiently stiffened to be unharmed when it is gripped by the drawing rollers 46.

The ribbon 37 formed at the confluence 36 may be gripped by edge rolls indicated at 56 in FIGURE 1 or edge forks to control the width of the ribbon 37 drawn upwardly from the confluence.

In addition, the stability of position of the confluence may be maintained by pairs of edge rolls 57 and 58 gripping the edges of the cooled ribbon of glass just before they are bent away from the bath surface. These edge rolls may be free running or they may be driven to determine the speed at which the cooled ribbons are fed to the confluence of the ribbons where they coalesce to form the ribbon 37 which is drawn through the drawing chamber. Instead of providing pairs of edge rolls 57 and 58, single edge rolls on top of the ribbon may be provided at these points in the bath.

There is thus provided a method of manufacturing flat glass in ribbon form having a lustre of fire finish quality and freedom from distortion, which qualities are achieved by advancing the glass for incorporation into the ribbon along a bath of molten metal, the ribbon produced having various commercial thicknesses of about 15 mm. and less.

The invention also comprehends flat glass in ribbon form produced by the method described above and sheets of glass cut from the ribbon.

We claim:

1. A method of manufacturing flat glass in ribbon form, comprising the steps of individually feeding molten glass at a controlled rate to opposite ends of an elongated bath of molten metal, advancing the glass along the bath from either end under thermal conditions which ensure unhindered lateral flow of the advancing glass to form two oppositely moving buoyant layers of molten glass advancing towards each other in ribbon form, cooling the ribbons of glass until they are sufficiently viscous to be raised from the bath, bending the cooled ribbons away from the bath surface to a confluence above the bath surface, at which confluence the undersurfaces of the ribbons coalesce to form a single ribbon, and drawing said single ribbon of glass upwardly from said confluence.

2. A method according to claim 1, including maintaining a protecting atmosphere over the bath of molten metal to prevent the formation in the bath of contaminants for the glass, and causing the flow of a purge of protecting atmosphere across the bath surface under the two ribbons as they are bent away from the bath surface to said confluence.

3. A method according to claim 1, including causing circulation of the molten metal in the bath in the region underneath said confluence, whereby the surface of the molten metal bath is continuously renewed in that region.

4. A method according to claim 1, including drawing the ribbon of glass upwardly from the said confluence by tractive effort applied to the ribbon from above, and regulating said tractive effort while controlling the viscosity of the glass as the ribbon is raised through the drawing chamber, whereby the ribbon is attenuated to the desired thickness and is sufficiently stiffened to arrest further dimensional change when that thickness is achieved.

5. A method of manufacturing flat glass in ribbon form comprising individually feeding glass at a controlled rate to opposite ends of an elongated bath of molten metal, forming on the bath from that glass two ribbons of glass advancing towards one another along the bath surface, bending the ribbons away from the bath surface to a confluence spaced above the bath surface, and controlling the cooling rate of the ribbons prior to bringing the ribbons together as they are bent away from the bath surface to form a single continuous sheet of glass which is drawn upwardly from the molten metal bath.

6. A method of manufacturing flat glass in ribbon form comprising the steps of individually feeding glass at a controlled rate to opposite ends of an elongated bath of molten metal, forming therefrom two oppositely moving ribbons of glass advancing towards each other along the bath by controlling the thermal condition of the advancing glass to ensure unhindered lateral flow of the glass to form two oppositely moving buoyant layers of molten glass advancing towards each other in ribbon form, cooling the ribbons of glass so formed while they are advancing along the elongated bath until they are sufficiently viscous to be bent away from the bath surface, bending the ribbons away from the bath surface to a confluence spaced above the bath surface, bringing the cooled ribbons together at said confluence where their undersurfaces coalesce to form a single ribbon, and drawing said single ribbon of glass upwardly from the molten metal bath.

7. A method of manufacturing flat glass in ribbon form comprising individually feeding glass at a controlled rate to opposite ends of an elongated bath of molten metal, forming two ribbons of glass advancing towards one another along the bath surface, controlling the cooling rate of the glass ribbons somewhat prior to the position of drawing both ribbons off the bath surface before the coming together of the ribbons to form a single sheet of glass, bending the ribbons away from the bath surface to a confluence spaced above the bath surface, and upwardly drawing the single sheet of glass so formed.

8. Apparatus for manufacturing flat glass in ribbon form, comprising an elongated tank structure containing a bath of molten metal, inlets for glass at opposite, widely-spaced ends of the tank structure, means for delivering glass on to the bath through said inlets and for advancing the glass along the bath as two ribbons of glass moving towards a confluence of the ribbons spaced above the bath surface in a central region of the tank structure at which confluence the undersurfaces of the ribbons coalesce and for bending the ribbons away from the bath surface to said confluence, temperature regulators in the tank structure on either side of said central region for cooling the advancing glass ribbons, a drawing chamber extending upwardly above said central region of the tank structure, means for controlling the position of lift-off of the ribbons from the bath surface, and means associated with the drawing chamber for continuously drawing sheet glass upwardly through the drawing chamber from said confluence.

9. Apparatus for manufacturing flat glass in ribbon form, comprising a tank structure containing an elongated bath of molten metal whose surface is wider than the ribbon of glass being formed and having inlets at opposite ends of the tank structure, means for delivering glass through said inlets and for advancing the glass along the molten metal as two oppositely moving ribbons of glass to a confluence in the central region of the tank structure where the layers coalesce, temperature regulators in the tank structure on either side of said central region for cooling the ribbons of glass as they are advanced until they are sufficiently viscous to be bent away from the bath surface to a confluence above the bath surface, edge rolls mounted in the tank structure to engage the edges of the two ribbons before they are bent away from the bath surface, a drawing chamber extending upwardly from the tank structure above said central region thereof, and means in the drawing chamber for drawing a ribbon of glass upwardly through the drawing chamber from said confluence.

10. Apparatus according to claim 9, including means for supplying protective atmosphere to the headspace over the tank structure, and means in the tank structure for causing a flow of protective atmosphere across the surface of the molten metal bath beneath the confluence of the two ribbons of glass which are bent away from the bath surface.

References Cited
UNITED STATES PATENTS

| | | | |
|---|---|---|---|
| 2,287,136 | 6/1942 | Rolland et al. | 65—92 |
| 3,083,551 | 4/1963 | Pilkington | 65—65 |
| 3,218,143 | 11/1965 | DeLajarte | 65—65 |
| 3,248,197 | 4/1966 | Michalik et al. | 65—32 |

DONALL H. SYLVESTER, *Primary Examiner.*

A. D. KELLOGG, *Assistant Examiner.*